(12) United States Patent
Kerr et al.

(10) Patent No.: US 7,811,532 B2
(45) Date of Patent: Oct. 12, 2010

(54) DUAL-FLOW VALVE AND INTERNAL PROCESSING VESSEL ISOLATION SYSTEM

(75) Inventors: Stuart Alexander Kerr, Knutford (GB); Benjamin James Arthur, Basingstoke (GB); Athanasios Georgios Tsirukis, Bethlehem, PA (US); James Robert Leenhouts, Blandon, PA (US); Jeffrey Ronald Phillips, Slatington, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 1140 days.

(21) Appl. No.: 11/399,322

(22) Filed: Apr. 7, 2006

(65) Prior Publication Data

US 2006/0231159 A1 Oct. 19, 2006

Related U.S. Application Data

(60) Provisional application No. 60/672,290, filed on Apr. 18, 2005.

(51) Int. Cl.
*A61M 25/085* (2006.01)
(52) U.S. Cl. .......................... 422/305; 422/40; 422/100; 422/103; 422/306; 137/505.33; 137/505.34; 137/606; 137/896; 141/3; 141/20; 141/21; 141/54; 141/55; 141/56; 141/57; 141/65; 141/66; 141/69; 141/70; 141/110; 141/392; 239/337; 239/338; 239/372; 239/373

(58) Field of Classification Search ............ 128/200.14, 128/200.23; 137/606, 896, 505.33, 505.34; 141/3, 20, 21, 54–57, 65, 66, 69, 70, 110, 141/392; 239/337, 338, 372, 373; 261/78.1; 251/153; 422/40, 100, 103, 305, 306; 436/180; 423/87; 96/202; 55/417
See application file for complete search history.

(56) References Cited

U.S. PATENT DOCUMENTS 4,286,624 A    9/1981   Clausen et al.

(Continued)

FOREIGN PATENT DOCUMENTS

EP    1 167 863 A1    1/2002

(Continued)

OTHER PUBLICATIONS

APCI eGas™ Arsine Generator Operations Manual, Mar. 28, 2005, Rev 3-0.

*Primary Examiner*—Brian Gordon
*Assistant Examiner*—Shogo Sasaki
(74) *Attorney, Agent, or Firm*—Rosaleen Morris-Oskanian

(57) ABSTRACT

Fluid flow valve assembly comprising a valve body having an external port and an inlet end having at least a first port, a second port, and a third port; a first valve disposed within the valve body and adapted to control fluid flow between the first and second ports; and a second valve disposed within the valve body and adapted to control fluid flow between the third port and the external port.

17 Claims, 3 Drawing Sheets

U.S. PATENT DOCUMENTS

| | | |
|---|---|---|
| 4,711,268 A | 12/1987 | Coleman |
| 4,723,967 A | 2/1988 | Tom |
| 4,738,693 A | 4/1988 | Tom |
| 5,409,526 A | 4/1995 | Zheng et al. |
| 5,678,602 A * | 10/1997 | Cannet et al. .......... 137/505.25 |
| 5,980,599 A | 11/1999 | Chris et al. |
| 6,257,000 B1 * | 7/2001 | Wang .......................... 62/48.1 |
| 6,343,476 B1 | 2/2002 | Wang et al. |
| 6,418,965 B2 | 7/2002 | Bryselbout |
| 6,494,343 B2 * | 12/2002 | McManus et al. ............. 222/55 |
| 6,920,904 B2 * | 7/2005 | Yquel ............................ 141/3 |
| 6,959,724 B2 * | 11/2005 | Heiderman ................. 137/494 |
| 6,962,268 B2 | 11/2005 | Bruat et al. |
| 2001/0037830 A1 * | 11/2001 | Sakurai ....................... 137/613 |
| 2003/0201027 A1 * | 10/2003 | Brennan et al. ................ 141/3 |
| 2003/0213521 A1 * | 11/2003 | Downie ................. 137/505.33 |
| 2004/0000338 A1 | 1/2004 | Heiderman |
| 2004/0123735 A1 | 7/2004 | Watanabe et al. |

FOREIGN PATENT DOCUMENTS

| | | |
|---|---|---|
| EP | 1 271 046 A2 | 1/2003 |
| EP | 1 367 316 A2 | 12/2003 |
| JP | 58 054277 A | 3/1983 |
| JP | 58-054277 A2 | 3/1983 |
| JP | 08-176873 A | 7/1996 |
| KR | 10-2001-0102936 A | 11/2001 |
| TW | 490541 A | 6/2002 |
| TW | 200402517 A | 2/2004 |
| WO | 03/041843 A1 | 5/2003 |
| WO | 03/054441 A1 | 7/2003 |

* cited by examiner

DUAL-FLOW VALVE AND INTERNAL PROCESSING VESSEL ISOLATION SYSTEM

CROSS-REFERENCE TO RELATED APPLICATIONS

This application claims priority to Provisional Application No. 60/672,290 filed on Apr. 18, 2005.

BACKGROUND OF THE INVENTION

Industrial gases which are utilized in small to moderate volumes are stored at ambient temperature in pressurized cylinders from which gas is withdrawn as needed. Gases which have critical temperatures below ambient temperature are stored at high pressures determined by the design pressure ratings of the cylinders. Examples of these include low-boiling gases such as nitrogen, oxygen, hydrogen, helium, and methane, which are withdrawn from the storage cylinders without phase change. Gases which have critical temperatures above ambient temperature are stored in cylinders as compressed saturated liquids at their respective vapor pressures, and these liquids vaporize as saturated vapor is withdrawn from the cylinders. Common examples of such liquefied compressed gases are chlorine, ammonia, and light hydrocarbons such as propane and butane.

There is a need in certain industries for very high purity gases supplied by cylinders as described above. For example, very high purity gases are utilized in the electronics industry for manufacturing semiconductor and optoelectronic devices, video display panels, fiber optic devices, and microelectromechanical systems. Examples of such gases include hydrogen chloride, hydrogen bromide, hydrogen fluoride, chlorine, ammonia, tungsten hexafluoride, disilane, dichlorosilane, trimethylsilane, and boron trichloride.

The demand for higher purity levels of these gases, especially those supplied as liquefied compressed gases, is growing. There is a trend towards the use of storage cylinders or vessels which have built-in purifiers within the cylinder or vessel that purify the stored gas as it is withdrawn, thereby providing an ultra-pure gas product. There is a need in the field of high purity gas supply systems for improved built-in purifiers having higher purification capacities and longer operating life. There also is a need for methods to isolate built-in purifiers from the gas during periods when gas is not being withdrawn through the purifiers. These needs are addressed by embodiments of the present invention descried below and defined by the claims that follow.

BRIEF SUMMARY OF THE INVENTION

An embodiment of the invention includes a fluid flow valve assembly comprising a valve body having an external port and an inlet end having at least a first port, a second port, and a third port; a first valve disposed within the valve body and adapted to control fluid flow between the first and second ports; and a second valve disposed within the valve body and adapted to control fluid flow between the third port and the external port.

Another embodiment of the invention relates to a fluid flow valve assembly comprising (a) a valve body having an external port and an inlet end having at least three ports; (b) a first valve disposed within the valve body and having an inlet, an outlet, and first seal adapted to allow fluid flow from the inlet to the outlet when the valve is open and to prevent fluid flow from the inlet to the outlet when the valve is closed; (c) a second valve disposed within the valve body and having an inlet, an outlet, and second seal adapted to allow fluid flow from the inlet to the outlet when the valve is open and to prevent fluid flow from the inlet to the outlet when the valve is closed; (d) a first fluid flow passage that connects the inlet of the first valve with a first port at the inlet end of the valve body and a second fluid flow passage that connects the outlet of the first valve to a second port at the inlet end of the valve body; and (e) a third fluid flow passage that connects the inlet of the second valve with a third port at the inlet end of the valve body and a fourth fluid flow passage that connects the outlet of the second valve to the external port of the valve body.

The fluid flow valve assembly may further comprise a fourth port at the inlet end of the valve body, an additional external port in the valve body, a third valve a disposed within the valve body and having an inlet, an outlet, a third seal adapted to allow fluid flow from the inlet to the outlet when the valve is open and to prevent fluid flow from the inlet to the outlet when the valve is closed, a fifth fluid flow passage that connects the outlet of the third valve with the fourth port at the inlet end of the valve body, and a sixth fluid flow passage that connects the inlet of the third valve to the additional external port in the valve body. Any of the first and second seal may comprise a flexible diaphragm adapted to be sealably forced against the inlet and outlet to prevent fluid flow between the inlet and outlet.

A related embodiment includes a fluid flow valve and fluid processing vessel assembly, comprising;
(a) fluid flow valve assembly having
 (1) a valve body having an external port and an inlet end with at least three ports;
 (2) a first valve disposed within the valve body and having an inlet, an outlet, and a first seal adapted to allow fluid flow from the inlet to the outlet when the valve is open and to prevent fluid flow from the inlet to the outlet when the valve is closed;
 (3) a second valve disposed within the valve body and having an inlet, an outlet, and a second seal adapted to allow fluid flow from the inlet to the outlet when the valve is open and to prevent fluid flow from the inlet to the outlet when the valve is closed;
 (4) a first fluid flow passage that connects the inlet of the first valve with a first port at the inlet end of the valve body and a second fluid flow passage that connects the outlet of the first valve to a second port at the inlet end of the valve body; and
 (5) a third fluid flow passage that connects the inlet of the second valve with a third port at the inlet end of the valve body and a fourth fluid flow passage that connects the outlet of the second valve to the external port of the valve body;
(b) a fluid processing vessel comprising an inlet, an outlet, and processing material disposed inside the vessel, wherein the processing vessel is adapted for processing a fluid flowing through the vessel; and
(c) an inlet tube that connects the inlet of the fluid processing vessel with the second port at the inlet end of the valve body and an outlet tube that connects the outlet of the fluid processing vessel with the first port at the inlet end of the valve body.

The fluid flow valve and fluid processing vessel assembly may further comprise a fourth port at the inlet end of the valve body, an additional external port in the valve body, a third valve a disposed within the valve body and having an inlet, an outlet, a third seal adapted to allow fluid flow from the inlet to the outlet when the valve is open and to prevent fluid flow from the inlet to the outlet when the valve is closed, a fifth fluid flow passage that connects the outlet of the third valve with the fourth port at the inlet end of the valve body, and a sixth fluid flow passage that connects the inlet of the third valve to the additional external port in the valve body.

The fluid flow valve and fluid processing vessel assembly may further comprise (d) a first check valve disposed between the inlet tube of the fluid processing vessel and the outlet tube of the fluid processing vessel and adapted to allow fluid flow from the outlet tube to the inlet tube and to prevent fluid flow from the inlet tube to the outlet tube and (e) a second check valve disposed in the outlet tube at a location between the first check valve and the outlet of the fluid processing vessel and adapted to allow fluid flow from the outlet of the fluid processing vessel to the third port at the inlet end of the valve body and to prevent fluid flow from the third port to the outlet of the fluid processing vessel.

The fluid processing material disposed inside the fluid processing vessel may be selected from the group consisting of adsorbent material, absorbent material, catalytic material, getter material, filtration material, and combinations thereof.

Another related embodiment of the invention includes a fluid storage and delivery system comprising (a) a fluid storage vessel having an opening and an interior;
(b) a fluid flow valve assembly comprising a valve body having an external port and an inlet end having at least a first port, a second port, and a third port; a first valve disposed within the valve body and adapted to control fluid flow between the first and second ports; and a second valve disposed within the valve body and adapted to control fluid flow between the third port and the external port; wherein valve body is sealably installed in the opening in the fluid storage vessel and the first, second, and third ports are located within the fluid storage vessel;
(c) a fluid processing vessel comprising an inlet, an outlet, and processing material disposed inside the fluid processing vessel and adapted for selectively processing a fluid flowing through the vessel, wherein the fluid processing vessel is disposed within the fluid storage vessel; and
(d) an inlet tube that connects the inlet of the fluid processing vessel with the second port at the inlet end of the valve body and an outlet tube that connects the outlet of the fluid processing vessel with the first port at the inlet end of the valve body.

The fluid storage vessel may contain a pressurized gas, and the pressurized gas may be selected from the group consisting of nitrogen, argon, helium, hydrogen, a noble gas, or a gas mixture. Alternatively, the fluid storage vessel may contain a pressurized liquefied gas, and the pressurized liquefied gas may be selected from the group consisting of hydrogen chloride, hydrogen bromide, hydrogen fluoride, chlorine, ammonia, tungsten hexafluoride, disilane, dichlorosilane, trimethylsilane, and boron trichloride.

The fluid storage vessel may include a reactor system disposed within the interior of the vessel and adapted for the generation of one or more chemical compounds, wherein the reactor system is adapted to discharge the one or more chemical compounds into the interior of the vessel.

The processing material disposed inside the fluid processing vessel may be selected from the group consisting of adsorbent material, absorbent material, catalytic material, getter material, filtration material, and combinations thereof.

An optional embodiment of the invention relates to a method for storing and dispensing a fluid comprising (a) providing a pressurized fluid storage and delivery system, including;
  (1) a fluid storage vessel having an opening and an interior;
  (2) a fluid flow valve assembly comprising a valve body having an external port and an inlet end having at least a first port, a second port, and a third port; a first valve disposed within the valve body and adapted to control fluid flow between the first and second ports; and a second valve disposed within the valve body and adapted to control fluid flow between the third port and the external port; wherein the valve body is sealably installed in the opening in the fluid storage vessel and the first, second, and third ports are located within the fluid storage vessel;
  (3) a fluid processing vessel comprising an inlet, an outlet, and processing material disposed inside the vessel, wherein the fluid processing vessel is disposed within the fluid storage vessel and is adapted for processing a fluid provided from the interior of the fluid storage vessel and flowing through the fluid processing vessel; and
  (4) an inlet tube that connects the inlet of the fluid processing vessel with the second port at the inlet end of the valve body and an outlet tube that connects the outlet of the fluid processing vessel with the first port at the inlet end of the valve body;
(b) introducing a fluid into the fluid storage vessel while maintaining the first and second valves in the closed positions;
(c) opening the first valve and the second valve, thereby placing each valve in the open position; and
(d) withdrawing fluid from the fluid storage vessel through the first valve, introducing the fluid into the fluid processing vessel, processing the fluid by contact with the processing material, withdrawing a processed fluid from the fluid processing vessel, passing the processed fluid through the second valve, and withdrawing the processed fluid via the external port.

The fluid flow valve assembly may comprise a fourth port at the inlet end of the valve body; a filling port in the valve body; a third valve disposed within the valve body having an inlet and an outlet, the third valve being adapted to allow fluid flow from the inlet to the outlet when the valve is in an open position and to prevent fluid flow from the inlet to the outlet when the valve is in a closed position; a fifth fluid flow passage that connects the outlet of the third valve with the fourth port at the inlet end of the valve body; and a sixth fluid flow passage that connects the inlet of the third valve to the filling port in the valve body. The fluid storage vessel may be filled by introducing the fluid into the filling port, through the third valve in the open position, and into the fluid storage vessel while maintaining the first and second valves in the closed position, and terminating the filling of the fluid storage vessel by placing the third valve in the closed position.

The pressurized fluid storage and delivery system may comprise (5) a first check valve disposed between the inlet tube of the fluid processing vessel and the outlet tube of the fluid processing vessel and adapted to allow fluid flow from the outlet tube to the inlet tube and to prevent fluid flow from the inlet tube to the outlet tube and (6) a second check valve disposed in the outlet tube at a location between the first check valve and the outlet of the fluid processing vessel and adapted to allow fluid flow from the outlet of the fluid processing vessel to the third port at the inlet end of the valve body and to prevent fluid flow from the third port to the outlet of the fluid processing vessel. The fluid storage vessel may be filled by placing the first and second valves in the open position, introducing the fluid into the product delivery port, through the first valve, through the first check valve, through the second valve, and into the fluid storage vessel, and terminating the filling of the fluid storage vessel by placing each of the first and second valves in the closed position.

Another optional embodiment of the invention relates to a system for generating a chemical product comprising (a) a primary vessel having an opening and an interior;
(b) a fluid flow valve assembly comprising a valve body having an external port and an inlet end having at least a first port, a second port, and a third port; a first valve disposed within the valve body and adapted to control fluid flow between the first and second ports; and a second valve disposed within the valve body and adapted to control fluid flow between the third port and the external port; wherein the valve body is sealably installed in the opening in the primary vessel, and wherein the first, second, and third ports are located within the primary vessel;
(c) a fluid processing vessel comprising an inlet, an outlet, and processing material disposed inside the fluid processing vessel, wherein the fluid processing vessel is disposed within the primary vessel and is adapted for processing a fluid provided from the interior of the primary vessel and flowing through the fluid processing vessel;
(d) an inlet tube that connects the inlet of the fluid processing vessel with the second port at the inlet end of the valve body and an outlet tube that connects the outlet of the fluid processing vessel with the first port at the inlet end of the valve body; and
(e) a reactor system disposed within the primary vessel and adapted to generate an impure chemical product and discharge the impure chemical product into the interior of the primary vessel.

The reactor system may be an electrochemical arsine generator adapted to generate moist arsine gas from an arsenic-containing metal by an electrochemical reaction. The system for generating a chemical product may be adapted to maintain a sub-atmospheric pressure in the interior of the primary vessel. The processing material disposed inside the fluid processing vessel may be drying material adapted to remove water from the moist arsine gas.

A further optional embodiment of the invention includes a method for generating a purified chemical product comprising
(a) providing a chemical generation system including
 (1) a primary vessel having an opening and an interior;
 (2) a fluid flow valve assembly comprising a valve body having an external port and an inlet end having at least a first port, a second port, and a third port; a first valve disposed within the valve body and adapted to control fluid flow between the first and second ports; and a second valve disposed within the valve body and adapted to control fluid flow between the third port and the external port; wherein the valve body is sealably installed in the opening in the primary vessel and the first, second, and third ports are located within the primary vessel;
 (3) a fluid processing vessel comprising an inlet, an outlet, and processing material disposed inside the fluid processing vessel, wherein the fluid processing vessel is disposed within the primary vessel and is adapted for processing a fluid provided from the interior of the primary vessel and flowing through the fluid processing vessel;
 (4) an inlet tube that connects the inlet of the fluid processing vessel with the second port at the inlet end of the valve body and an outlet tube that connects the outlet of the fluid processing vessel with the first port at the inlet end of the valve body; and
 (5) a reactor system disposed within the primary vessel and adapted to generate an impure chemical product and discharge the impure chemical product into the interior of the primary vessel;
(b) generating the impure chemical product and discharging the impure chemical product into the interior of the primary vessel; and
(c) passing the impure chemical product through the fluid processing vessel to provide the purified chemical product and withdrawing the purified chemical product through the second valve and the external port of the valve body.

The reactor system may be an electrochemical arsine generator adapted to generate moist arsine gas from an arsenic-containing metal by an electrochemical reaction. The system may be operated to maintain a sub-atmospheric pressure in the interior of the primary vessel. Water may be removed from the moist arsine gas by drying material disposed inside the fluid processing vessel.

Yet another embodiment of the invention includes a method for generating a chemical product comprising
(a) providing a chemical generation system, including
 (1) a primary vessel having an opening and an interior, the interior containing a first reactive component;
 (2) a fluid flow valve assembly comprising a valve body having an external port and an inlet end having at least a first port, a second port, and a third port; a first valve disposed within the valve body and adapted to control fluid flow between the first and second ports; and a second valve disposed within the valve body and adapted to control fluid flow between the third port and the external port; wherein the valve body is sealably installed in the opening in the primary vessel and the first, second, and third ports are located within the primary vessel;
 (3) a fluid processing vessel comprising an inlet, an outlet, and a first reactive component disposed in the interior of the fluid processing vessel, wherein the fluid processing vessel is disposed within the primary vessel; and
 (4) an inlet tube that connects the inlet of the fluid processing vessel with the second port at the inlet end of the valve body and an outlet tube that connects the outlet of the fluid processing vessel with the first port at the inlet end of the valve body;
(b) passing the first reactive component through the first valve and into the fluid processing vessel;
(c) reacting the first reactive component and the second reactive component to form a product component, and withdrawing the product component from the fluid processing vessel; and
(d) withdrawing the product component through the second valve and the external port.

DETAILED DESCRIPTION OF THE INVENTION

Figure 1:
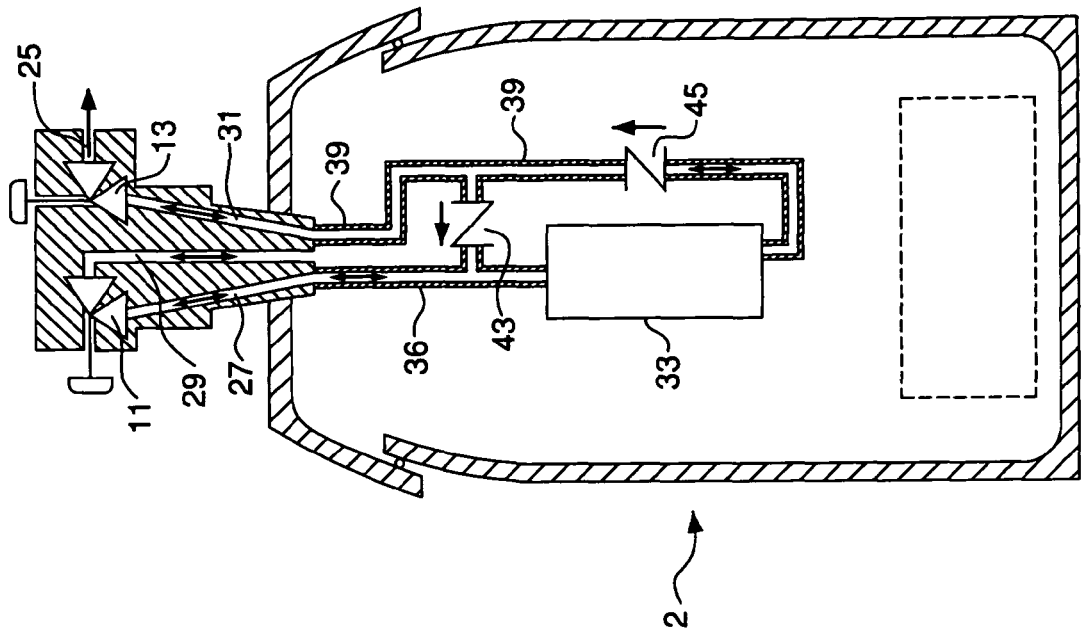
FIG. 1 is schematic cross-section of a fluid storage and delivery system according to an embodiment of the present invention.

A single bodied, dual-valve cylinder valve assembly is utilized in embodiments of the present invention to allow the isolation of one or more processing vessels or chambers located within a primary or storage vessel. The valve prevents the communication of the primary vessel contents during filling, transport, or storage. The internal vessel or vessels may have any process functionality such as, for example, storage containers, reactors, purifiers, and electrolytic cells.

Traditional gas cylinders, which include high pressure gas cylinders containing gas above its critical temperature and liquefied gas cylinders containing saturated liquid at its equilibrium vapor pressure, provide means for the safe storage and transportation of these gases and liquids. There is a trend towards the use of storage cylinders or vessels which have built-in purifiers within the cylinder or vessel that purify the stored gas as it is withdrawn, thereby providing an ultra-pure gas product. Embodiments of the present invention may be applied to such built-in purifiers.

Other embodiments of the invention also may include alternative methods of storing or generating a gaseous product within the primary vessel or cylinder. For example, the cylinder may contain an internal electrolytic cell for the generation of arsine ($AsH_3$). In another alternative, the primary vessel or cylinder may contain gas adsorbed on a solid adsorbent under pressure, wherein gas is released for discharge when the pressure is reduced. In either of these alternatives, the product gas may be treated or purified before final withdrawal by contact with a processing material in a processing vessel located within the primary vessel or storage cylinder. The single bodied, dual-valve cylinder valve assembly can be installed in the outlet of the storage cylinder and operated in either of two modes. In the first mode, which is utilized during filling, storage, and transportation of the cylinder, both valves in the cylinder valve assembly are closed to isolate the processing material in the internal processing vessel from the contents of the storage cylinder. In the second mode, which is utilized during withdrawal of purified product gas from the cylinder, both valves in the cylinder valve assembly are opened to pass stored or generated gas from the cylinder through the internal processing vessel for final purification.

The one or more internal processing vessels or chambers located within the primary vessel or cylinder may be adapted to perform several different unit operations. For example, in the embodiment wherein arsine ($AsH_3$) is generated by an electrolytic generator within the primary vessel or cylinder, an internal processing vessel containing adsorbent drying material may be used to remove water from the crude generated arsine. During transportation of the cylinder, both valves in the dual-valve cylinder valve assembly are closed to isolate the cylinder from the atmosphere and to isolate the internal processing vessel containing drying material from the electrolytic cell to prevent water vapor from the cell to saturate the adsorbent in during transportation or storage.

In another embodiment, the dual-valve cylinder valve assembly may be installed in a cylinder operated as a reaction vessel for onsite gas generation. In this application, the cylinder is fitted with two internal processing vessels, each processing vessel containing a different reactant material. The two vessels are maintained in isolation during transportation or storage by closing both valves in the dual-valve cylinder valve assembly. To operate the system for onsite gas generation, the two internal processing vessels are allowed to communicate by opening the two valves so that reactant material flows from the first processing vessel to the second processing vessel, where a reaction occurs, and by withdrawing a gaseous product from the cylinder.

A third embodiment is the use of the built-in purifier concept for the storage, transportation, and purification of liquids or liquefied gases. The primary vessel or cylinder stores the fluid, and an internal processing vessel or chamber contains an adsorbent purification material. The two compartments are isolated during filling, transportation, and storage by closing both valves so that the adsorbent remains isolated. The cylinder interior and the internal processing vessel then are placed in flow communication by opening both valves, whereby stored fluid is purified by the adsorbent and purified product is withdrawn from the cylinder.

The internal fluid processing vessel, the fluid flow valve assembly, the fluid storage vessel, and associated tubing may be constructed of stainless steel, preferably from an austenitic stainless steel such as AISI316. Alternatively, carbon steel, low alloy steel, copper, copper alloys, nickel, nickel alloys (such as Hastelloy® C22 and the like), cupronickel alloys, and other similar metallic alloys may be preferred in certain applications. Nonmetallic materials such as engineering polymers (for example, polyvinylidenedifluoride (Kynar™)), glass, and ceramic materials could be practical in certain selected applications.

The fluid in the cylinder may be any gas above its critical temperature such as, for example, nitrogen, argon, helium, hydrogen, a noble gas, or a gas mixture. Alternatively, the fluid in the cylinder may be a compressed liquefied gas comprising coexisting vapor and liquid phases. Typical compressed liquefied gases may include, for example, hydrogen chloride, hydrogen bromide, hydrogen fluoride, chlorine, ammonia, tungsten hexafluoride, disilane, dichlorosilane, trimethylsilane, and boron trichloride. Alternatively, other compressed liquefied gases not listed here may be stored in the cylinder.

The term "processing" as applied herein to a fluid or gas stream is defined as any operation in which the physical and/or chemical properties of the stream are changed. Processing may include, for example, adsorptive purification, absorptive purification, gettering, chemical reaction, electrochemical reaction, and scrubbing.

The indefinite articles "a" and "an" as used herein mean one or more when applied to any feature in embodiments of the present invention described in the specification and claims. The use of "a" and "an" does not limit the meaning to a single feature unless such a limit is specifically stated. The definite article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity.

An exemplary embodiment of the invention is shown the schematic diagram of FIG. 1. In this illustration, dual-valve fluid flow valve assembly 1 is installed in cylinder 2 comprising top section 3 sealably attached or connected to cylinder body 5. The valve assembly may be attached to top section 3 by a pipe thread seal, welding, sealed flange, or any other appropriate method. Top section 3 is attached to body 5 by seal 7, which may be, for example, an O-ring or gasket seal compressed between sealing faces as shown. Alternatively, a flanged seal may be used (not shown). In another alternative, dual-valve fluid flow valve assembly 1 may be installed by threading into a high pressure gas cylinder (not shown).

Valve assembly 1 comprises valve body 9 that includes an integrated first valve 11 and an integrated second valve 13 having external handles or wrench connectors 15 and 17, respectively. The inlet end of the valve body is sealably inserted into top section 3 as shown, the inlet end has three ports 19, 21, and 23, and the valve body has outlet port 25. The outlet of valve 11 is connected to port 19 via fluid flow passage 27 and the inlet of valve 11 is connected to port 21 via fluid flow passage 29. The inlet of valve 13 is connected to port 23 via fluid flow passage 31 and the outlet of valve 13 is connected to outlet port 25. Fluid processing vessel 33 is located in the interior of cylinder body 5, and the vessel has inlet 35 and outlet 37. Port 19 and inlet 35 are connected by inlet tube 36, and port 23 and outlet 37 are connected by outlet tube 39. Fluid processing vessel contains processing material including, for example, adsorbent materials, absorbent materials, catalytic materials, getter materials, and filtration materials.

When valve 11 is closed, the fluid or gas within cylinder 2 is isolated from the processing material in fluid processing vessel 33. When valve 13 is closed, the entire system is isolated from the surrounding atmosphere. When valves 11 and 13 are open, fluid or gas from the interior of the cylinder flows via port 21, passage 29, valve 11, passage 27, port 19, and inlet tube 37 into processing vessel 33. The fluid or gas is reacted or purified in vessel 33, and purified product flows via outlet tube 39, port 23, flow passage 31, valve 13, and outlet port 25.

In an embodiment of the invention, the interior of cylinder 2 includes gas generation device 41 adapted to generate a gas internally. This generation device may be, for example, an electrolytic generator for the production of arsine ($AsH_3$). In this embodiment, moist arsine gas is produced from an arsenic-containing metal by an electrochemical reaction, flows into the interior of cylinder 2, and is purified by passage through a drying adsorbent material in processing vessel 33. During transportation and storage of the cylinder, valves 11 and 13 are closed to isolate the drying adsorbent material from gas generation device 41 and during operation valves 13 and 15 are open.

Cylinder body 5 may be filled with a liquid or liquefied gas and top section 3 sealably connected to the body to form cylinder 2. Alternatively, cylinder 2 may be filled after being sealed closed by a separate fill line and valve (not shown). In another alternative, valve body 9 may be modified to include another integrated valve (not shown) having an inlet connected to an additional external port and an outlet connected via a fourth fluid flow passage to a fourth port at the inlet and of valve body 9. This additional external port and valve may be used to fill cylinder 2.

Figure 2:
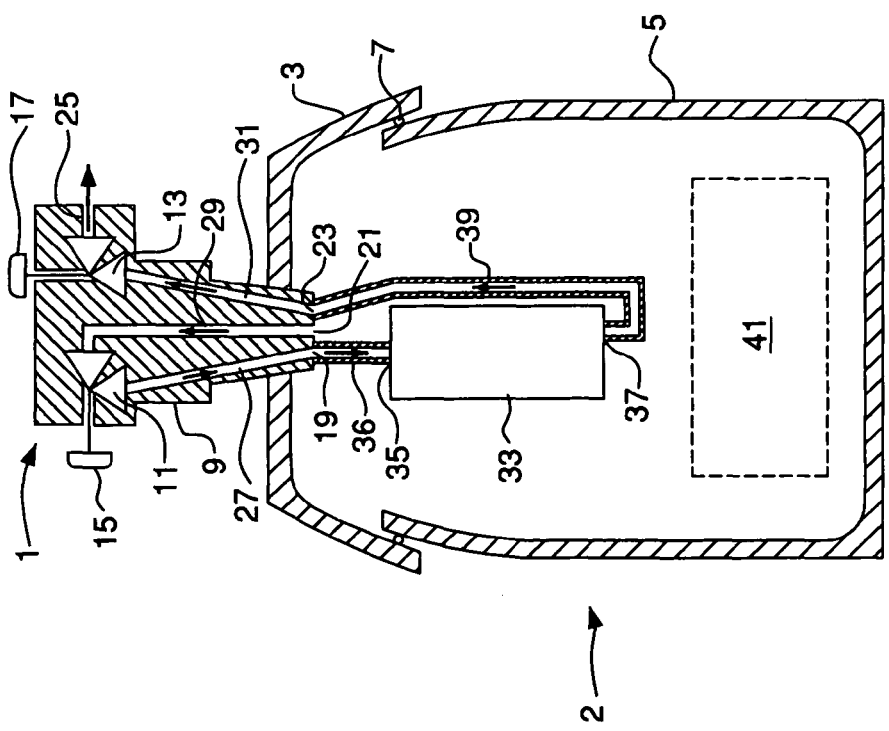
FIG. 2 is schematic cross-section of a fluid storage and delivery system according to another embodiment of the present invention.

Another alternative for the filling of cylinder 2 is illustrated in FIG. 2. In this alternative, the inlet and outlet tubing of processing vessel 33 is modified by installing check valve 43 between inlet tube 36 and outlet tube 39 as shown. Check valve 43 allows flow from outlet tube 39 to inlet tube 36 and prevents flow in the opposite direction. Check valve 45 is installed in outlet tube 39 as shown to allow flow out of processing vessel 33 and prevent flow in the opposite direction into processing vessel 33. This modification may be used to fill a sealed cylinder 2 by opening valves 11 and 13 and introducing fluid via outlet port 25. The fluid flows through valve 13, passage 31, tube 39, check valve 43, tube 36, passage 27, valve 11, and passage 29 into the interior of cylinder 2. When fluid is withdrawn from the cylinder via valve 13, the valve assembly operates in the manner described above with reference to FIG. 1.

In the embodiment of FIG. 1, valve 11 has a seal or sealing mechanism within the valve operated by handle 15 to allow fluid flow from passage 29 to passage 27 when the valve is open and to prevent fluid flow from passage 29 to passage 27 when the valve is closed. Also in the embodiment of FIG. 1, valve 13 has a seal or sealing mechanism within the valve operated by handle 17 to allow fluid flow from passage 31 to outlet port 25 when the valve is open and to prevent fluid flow from passage 31 to outlet port 25 when the valve is closed.

In the embodiment of FIG. 2, the seal or sealing mechanism in valve 11 allows fluid flow from passage 29 to passage 27 or from passage 27 to passage 29 when the valve is open (depending on which operating mode is used) and prevents fluid flow from passage 29 to passage 27 or from passage 27 to passage 29 when the valve is closed (depending on which operating mode is used). Also in the embodiment of FIG. 2, the seal or sealing mechanism in valve 13 allows fluid flow from outlet port 25 to passage 31 or from passage 31 to outlet port 25 when the valve is open (depending on which operating mode is used) and prevents fluid flow from outlet port 25 to passage 31 or from passage 31 to outlet port 25 (depending on which operating mode is used) when the valve is closed.

Either or both of valves 11 and 17 may be diaphragm-type valves wherein the seal or sealing mechanism is a diaphragm operated by handle 15 and/or 17, respectively. Alternatively, either or both of valves 11 and 17 may be any other type of valve known in the art that provides an equivalent sealing function.

The systems of FIGS. 1 and 2 may be used for alternative process functions. For example, a reactive component A may be stored in the interior of cylinder 2 and another reactive component B may be stored in processing vessel 33. Components A and B are isolated when valves 11 and 13 are closed. When valves 11 and 13 are opened, Component A flows through passage 29, valve 11, and passage 36 into processing vessel 33, where components A and B react to form one or more reaction products. These reaction products are withdrawn through outlet tube 39, passage 31, valve 13, and port 25. In another alternative, two vessels may be installed within cylinder 2, one vessel containing reactive component A and the other containing reactive component B. These vessels can be installed within cylinder 2 so that both can be isolated, and cylinder 2 can provide safe containment for the two vessels. This can be accomplished in a modification of the system of FIG. 2 wherein a second internal vessel (not shown) is installed in outlet line 39 between valve 45 and the inlet to passage 31. Component A is stored under pressure in vessel 33 and component B is stored under pressure in the second internal vessel. Components A and B are isolated when valves 11 and 13 are closed. When valves 11 and 13 are opened, component A flows through check valve 45 into the second internal vessel, where it reacts with component B to form one or more product components, which then flow through passage 31, valve 13, and port 25.

An example of the single-bodied, dual-valve cylinder valve assembly described above is illustrated in the external view of FIG. 3. Valve body 9 has two integrated internal valves and fluid flow passageways as illustrated above with reference to FIG. 1. The two internal valves 11 and 13 are operated by handles 301 and 303 respectively. Alternatively, handle 301 may be replaced with a wrench-operated valve stem for safety purposes. Inlet end 305 may be threaded for insertion into a threaded cylinder inlet or flanged cylinder top section as needed. Outlet 307 corresponds to outlet port 25 of FIG. 1.

Figure 4:
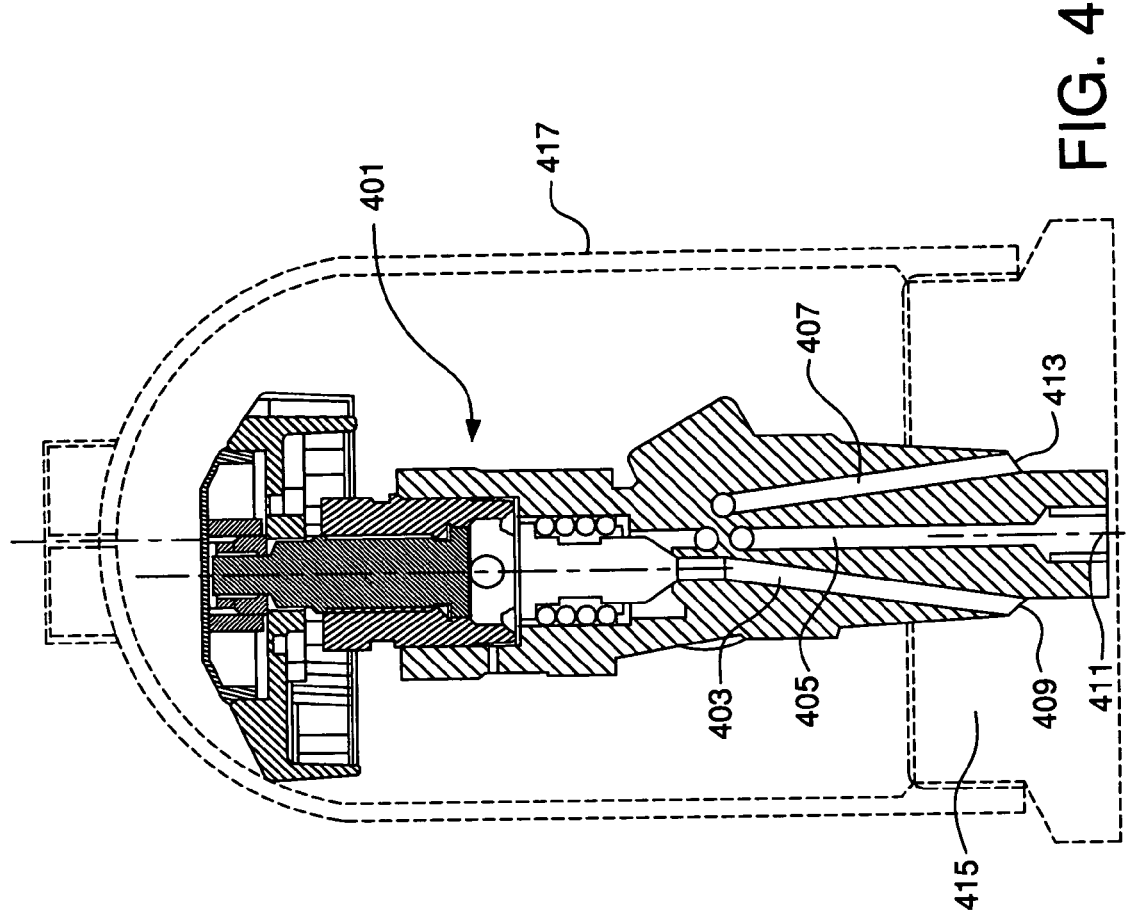
FIG. 4 is sectional view 4-4 of the fluid flow valve assembly of FIG. 3.
Figure 3:
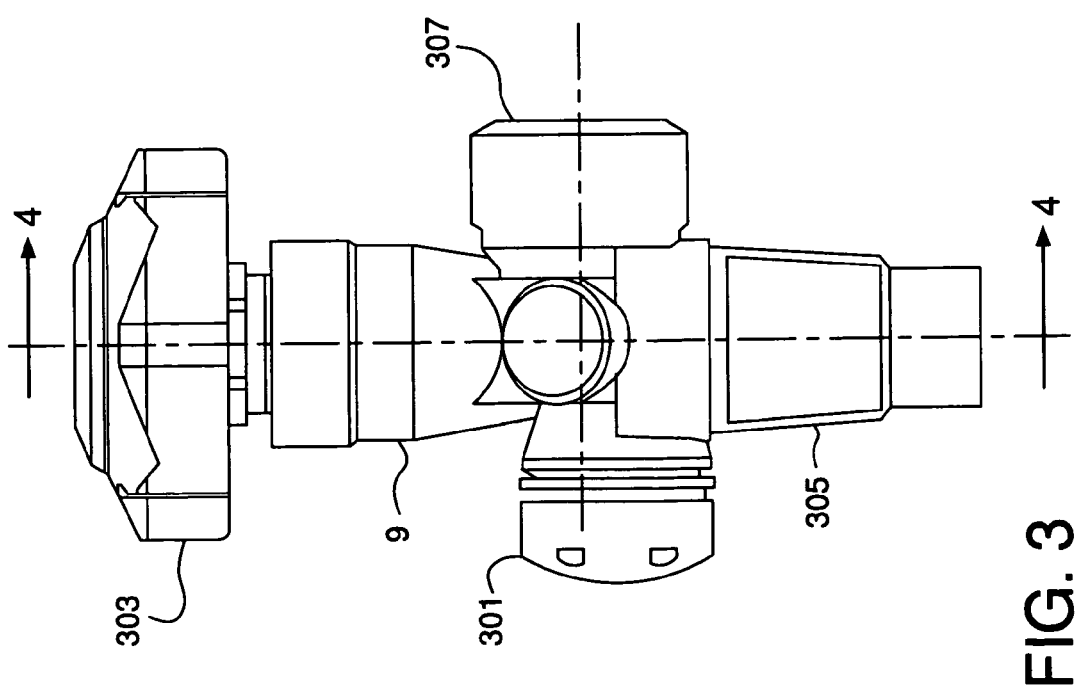
FIG. 3 is a side view of a fluid flow valve assembly for use in the fluid storage and delivery systems of FIGS. 1 and 2.

Section 4-4 of FIG. 3 is shown in FIG. 4, in which valve 401 corresponds to valve 13 of FIG. 1 and fluid flow passages 403, 405, and 407 correspond to passages 31, 29, and 27, respectively, in FIG. 1. Ports 409, 411, and 413 of FIG. 4 correspond to ports 23, 21, and 19, respectively, of FIG. 1. FIG. 4 illustrates the installation of the single bodied, dual-valve cylinder valve assembly in exemplary cylinder 415, for example, by a sealable threaded connection. Exemplary cylinder cap 417 may be used to protect the cylinder valve assembly during transportation and storage as required.

Figure 6:
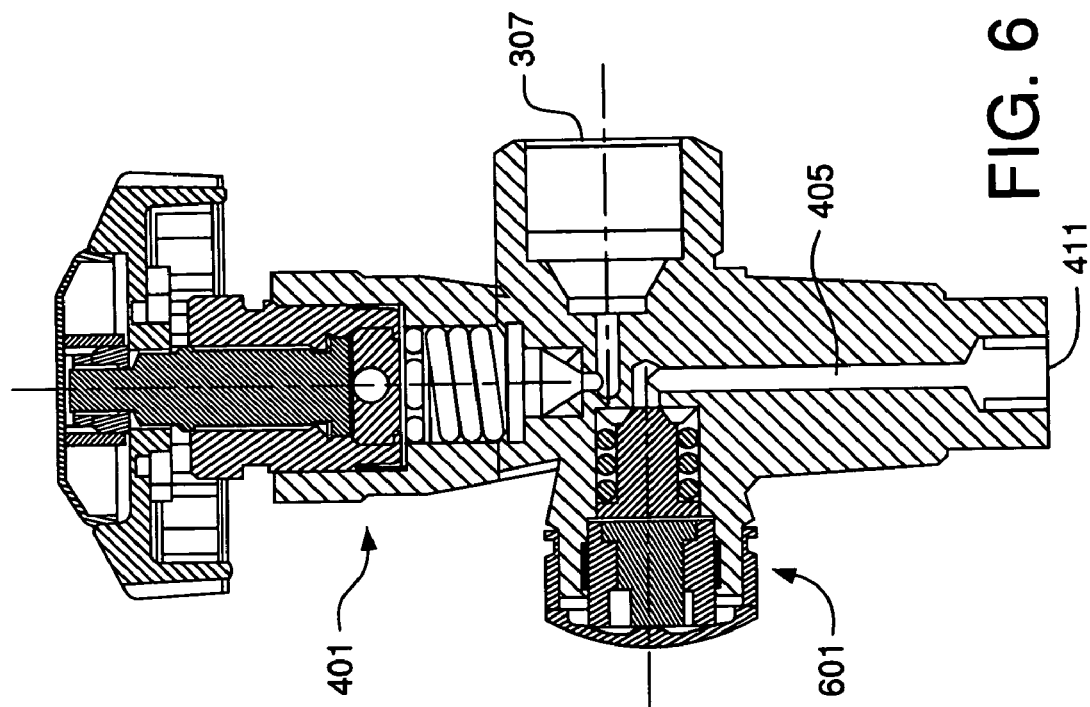
FIG. 6 is sectional view 6-6 of the fluid flow valve assembly of FIG. 5.
Figure 5:
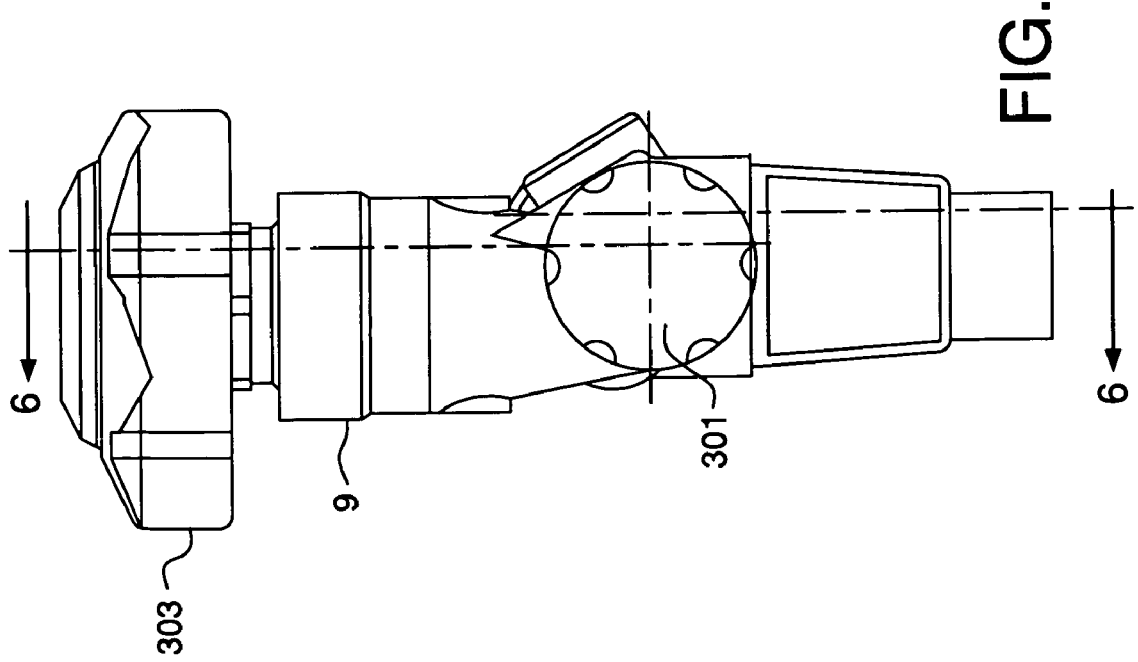
FIG. 5 is a side view of the fluid flow valve assembly of FIG. 3 rotated 90 degrees.

FIG. 5 is an external view of FIG. 3 rotated 90 degrees showing body 9, handle 301, and handle 303. FIG. 6 is section 6-6 of FIG. 5 showing valves 401 and 601, which correspond to valves 13 and 15, respectively, of FIG. 1. Outlet 307 corresponds to outlet port 25 of FIG. 1, fluid flow passage 405 corresponds to passage 29, and port 411 corresponds to port 21.

The invention claimed is:

1. A fluid storage and delivery system comprising
   (a) a fluid storage vessel having an opening and an interior;
   (b) a fluid flow valve assembly comprising a valve body having an external port and an inlet end having at least a first port, a second port, and a third port; a first valve disposed within the valve body and in fluid communication with the first and second ports; and a second valve disposed within the valve body and in fluid communication with the third port and the external port; wherein valve body is sealably installed in the opening in the fluid storage vessel and the first, second, and third ports are located within the fluid storage vessel;
   (c) a fluid processing vessel comprising an inlet, an outlet, and a processing material disposed inside the fluid processing vessel, wherein the fluid processing vessel is disposed within the fluid storage vessel; and
   (d) an inlet tube that connects the inlet of the fluid processing vessel with the second port at the inlet end of the valve body and an outlet tube that connects the outlet of the fluid processing vessel with the third port at the inlet end of the valve body.

2. The fluid storage and delivery system of claim 1 wherein the fluid storage vessel contains a pressurized gas.

3. The fluid storage and delivery system of claim 2 wherein the pressurized gas is at least one gas selected from the group consisting of nitrogen, argon, helium, hydrogen, neon, krypton, xenon, radon, and combinations thereof.

4. The fluid storage and delivery system of claim 1 wherein the fluid storage vessel contains a pressurized liquefied gas.

5. The fluid storage and delivery system of claim 4 wherein the pressurized liquefied gas is at least one gas selected from the group consisting of hydrogen chloride, hydrogen bromide, hydrogen fluoride, chlorine, ammonia, tungsten hexafluoride, disilane, dichlorosilane, trimethylsilane, and boron trichloride.

6. The fluid storage and delivery system of claim 1 wherein the fluid storage vessel further comprises a reactor system disposed within the interior of the fluid storage vessel, wherein the reactor system is in fluid communication with the interior of the fluid storage vessel.

7. The fluid storage and delivery system of claim 1 wherein the processing material disposed inside the fluid processing vessel is selected from the group consisting of adsorbent material, absorbent material, catalytic material, getter material, filtration material, and combinations thereof.

8. A system for generating a chemical product comprising
   (a) a primary vessel having an opening and an interior;
   (b) a fluid flow valve assembly comprising a valve body having an external port and an inlet end having at least a first port, a second port, and a third port; a first valve disposed within the valve body in fluid communication with the first and second ports; and a second valve disposed within the valve body in fluid communication with the third port and the external port; wherein the valve body is sealably installed in the opening in the primary vessel, and wherein the first, second, and third ports are located within the primary vessel;
   (c) a fluid processing vessel comprising an inlet, an outlet, and a processing material disposed inside the fluid processing vessel, wherein the fluid processing vessel is disposed within the primary vessel;
   (d) an inlet tube that connects the inlet of the fluid processing vessel with the second port at the inlet end of the valve body and an outlet tube that connects the outlet of the fluid processing vessel with the third port at the inlet end of the valve body; and
   (e) a reactor system disposed within the primary vessel wherein the reactor system generates the chemical product.

9. The system of claim 8 wherein the reactor system is an electrochemical arsine generator.

10. The system of claim 9 wherein the processing material disposed inside the fluid processing vessel is a drying material.

11. A method for generating a chemical product comprising
    (a) providing a chemical generation system including
       (1) a primary vessel having an opening and an interior, the interior containing a first reactive component;
       (2) a fluid flow valve assembly comprising a valve body having an external port and an inlet end having at least a first port, a second port, and a third port; a first valve disposed within the valve body and adapted to control fluid flow between the first and second ports; and a second valve disposed within the valve body and adapted to control fluid flow between the third port and the external port; wherein the valve body is sealably installed in the opening in the primary vessel and the first, second, and third ports are located within the primary vessel;
       (3) a fluid processing vessel comprising an inlet, an outlet, and a second reactive component disposed in the interior of the fluid processing vessel, wherein the fluid processing vessel is disposed within the primary vessel; and
       (4) an inlet tube that connects the inlet of the fluid processing vessel with the second port at the inlet end of the valve body and an outlet tube that connects the outlet of the fluid processing vessel with the third port at the inlet end of the valve body;
    (b) passing the first reactive component through the first valve and into the fluid processing vessel; and
    (c) reacting the first reactive component and the second reactive component to form a product component, and withdrawing the product component from the fluid processing vessel; and
    (d) withdrawing the product component through the second valve and the external port.

12. A method for storing and dispensing a fluid comprising
    (a) providing a pressurized fluid storage and delivery system, including;
       (1) providing a fluid storage vessel having an opening, an interior, and a fluid disposed in the interior;
       (2) providing a fluid flow valve assembly comprising a valve body having an external port and an inlet end having at least a first port, a second port, and a third port; a first valve disposed within the valve body and adapted to control fluid flow between the first and second ports; and a second valve disposed within the valve body and adapted to control fluid flow between the third port and the external port; wherein the valve body is sealably installed in the opening in the fluid storage vessel and the first, second, and third ports are located within the fluid storage vessel and wherein the first valve and the second valve are each in the closed position;
- (3) providing a fluid processing vessel comprising an inlet, an outlet, and processing material disposed inside the fluid processing vessel, wherein the fluid processing vessel is disposed within the fluid storage vessel and is adapted for processing a fluid provided from the interior of the fluid storage vessel and flowing through the fluid processing vessel; and
- (4) providing an inlet tube that connects the inlet of the fluid processing vessel with the second port at the inlet end of the valve body and an outlet tube that connects the outlet of the fluid processing vessel with the third port at the inlet end of the valve body;

(b) opening the first valve and the second valve, thereby placing each valve in the open position; and (c) withdrawing fluid from the fluid storage vessel through the first valve, introducing the fluid into the fluid processing vessel, processing the fluid by contact with the processing material, withdrawing a processed fluid from the fluid processing vessel, passing the processed fluid through the second valve, and withdrawing the processed fluid via the external port.

13. The method of claim 12 wherein the pressurized fluid storage and delivery system further comprises (5) a first check valve disposed between the inlet tube of the fluid processing vessel and the outlet tube of the fluid processing vessel and adapted to allow fluid flow from the outlet tube to the inlet tube and to prevent fluid flow from the inlet tube to the outlet tube; and (6) a second check valve disposed in the outlet tube at a location between the first check valve and the outlet of the fluid processing vessel and adapted to allow fluid flow from the outlet of the fluid processing vessel to the third port at the inlet end of the valve body and to prevent fluid flow from the third port to the outlet of the fluid processing vessel; and wherein the fluid storage vessel is filled in (a)(1) by placing the first and second valves in the open position, introducing the fluid into the product delivery port, through the first valve, through the first check valve, through the second valve, and into the fluid storage vessel, and terminating the filling of the fluid storage vessel by placing each of the first and second valves in the closed position.

14. A method for generating a purified chemical product comprising
- (a) providing a chemical generation system including
  - (1) a primary vessel having an opening and an interior;
  - (2) a fluid flow valve assembly comprising a valve body having an external port and an inlet end having at least a first port, a second port, and a third port; a first valve disposed within the valve body and adapted to control fluid flow between the first and second ports; and a second valve disposed within the valve body and adapted to control fluid flow between the third port and the external port; wherein the valve body is sealably installed in the opening in the primary vessel and the first, second, and third ports are located within the primary vessel;
  - (3) a fluid processing vessel comprising an inlet, an outlet, and processing material disposed inside the fluid processing vessel, wherein the fluid processing vessel is disposed within the primary vessel and is adapted for processing a fluid provided from the interior of the primary vessel and flowing through the fluid processing vessel;
  - (4) an inlet tube that connects the inlet of the fluid processing vessel with the second port at the inlet end of the valve body and an outlet tube that connects the outlet of the fluid processing vessel with the third port at the inlet end of the valve body; and
  - (5) a reactor system disposed within the primary vessel and adapted to generate an impure chemical product and discharge the impure chemical product into the interior of the primary vessel;
- (b) generating the impure chemical product and discharging the impure chemical product into the interior of the primary vessel; and
- (c) passing the impure chemical product through the fluid processing vessel to provide the purified chemical product and withdrawing the purified chemical product through the second valve and the external port of the valve body.

15. The method of claim 14 wherein the reactor system is an electrochemical arsine generator adapted to generate moist arsine gas from an arsenic-containing metal by an electrochemical reaction.

16. The method of claim 14 wherein the reactor system for generating a chemical product is operated to maintain a subatmospheric pressure in the interior of the primary vessel.

17. The method of claim 15 wherein water is removed from the moist arsine gas by drying material disposed inside the fluid processing vessel.

* * * * *

UNITED STATES PATENT AND TRADEMARK OFFICE
CERTIFICATE OF CORRECTION

PATENT NO. : 7,811,532 B2  
APPLICATION NO. : 11/399322  
DATED : October 12, 2010  
INVENTOR(S) : Stuart Alexander Kerr et al.

Page 1 of 1

It is certified that error appears in the above-identified patent and that said Letters Patent is hereby corrected as shown below:

On the Title page, item (75) Inventors:
The second inventor's name should read "Benjamin James Arthur Inman".

Signed and Sealed this

Twenty-eighth Day of December, 2010

David J. Kappos
*Director of the United States Patent and Trademark Office*